United States Patent [19]

Burns et al.

[11] Patent Number: 5,254,392
[45] Date of Patent: * Oct. 19, 1993

[54] ANTI-IRIDESCENCE COATINGS

[75] Inventors: Carole G. Burns, Canton; Daryl J. Middleton, Riverview; James W. Proscia, Dearborn, all of Mich.

[73] Assignee: Ford Motor Company, Dearborn, Mich.

[*] Notice: The portion of the term of this patent subsequent to Dec. 1, 2009 has been disclaimed.

[21] Appl. No.: 720,135

[22] Filed: Jun. 24, 1991

[51] Int. Cl.$^5$ .............................. B32B 7/02
[52] U.S. Cl. ...................... 428/212; 427/108; 427/109; 427/126.3; 427/166; 427/167; 427/255; 427/255.3; 428/34; 428/428; 428/432; 428/699; 428/701; 428/702
[58] Field of Search .............. 428/34, 212, 213, 216, 428/428, 432, 699, 701, 702; 427/108, 109, 126.3, 166, 167, 255, 255.3

[56] References Cited

U.S. PATENT DOCUMENTS

| | | | |
|---|---|---|---|
| 2,758,510 | 8/1956 | Auwarter | 359/581 |
| 2,932,592 | 4/1960 | Cameron | 359/589 |
| 3,176,574 | 4/1965 | Socha | 359/586 |
| 3,378,396 | 4/1968 | Zaromb | 428/428 |
| 3,990,784 | 11/1976 | Gelber | 359/589 |
| 4,187,336 | 2/1980 | Gordon | 428/34 |
| 4,308,316 | 12/1981 | Gordon | 428/336 |
| 4,310,584 | 1/1982 | Cooper et al. | 428/212 |
| 4,377,613 | 3/1983 | Gordon | 428/212 |
| 4,419,386 | 12/1983 | Gordon | 427/109 |
| 4,440,822 | 4/1984 | Gordon | 428/216 |
| 4,556,599 | 12/1985 | Sato et al. | 428/216 |
| 4,581,280 | 4/1986 | Taguchi et al. | 428/212 |
| 4,971,843 | 11/1990 | Michelotti | 428/34 |

FOREIGN PATENT DOCUMENTS

| | | |
|---|---|---|
| 0041358 | 5/1981 | European Pat. Off. |
| 0348185 | 12/1989 | European Pat. Off. |
| 212705 | 3/1986 | Japan |
| 2-225345 | 9/1990 | Japan |

OTHER PUBLICATIONS

Vasicek, A., *Optics of Thin Films*, North-Holland Publishing Company, Amsterdam, 1960.

Hamburg et al., "Evaporated Sn-doped $In_2O_3$ films: Basic Optical properties and applications to energy-efficient windows", *J. Appl. Phys.* 60(11), Dec. 1, 1986.

Berning, "Principles of design of architrectural coatings", *Applied Optics*, vol. 22, p. 4127, Dec. 15, 1983.

MacLeod, "Thin-Film Optical Filters", Adam Hilger Ltd., London, 1969, pp. 37–43.

*Primary Examiner*—Paul J. Thibodeau
*Assistant Examiner*—H. Thi Le
*Attorney, Agent, or Firm*—Lorraine S. Melotik; Roger L. May

[57] ABSTRACT

A glazing article comprises a substrate bearing a substantially transparent coating comprising an optically functional topcoat and a thinner anti-iridescence layer undercoat mediate the topcoat and the substrate. The anti-iridescence layer eliminates or substantially reduces iridescence and, in addition, is readily designed to make the overall coating either colorless or to provide a substantially uniform muted color. The anti-iridescence layer comprises a first thickness zone in which the refractive index is higher than that of the substrate. A low refractive index zone is positioned directly on the high refractive index zone. A second high refractive index zone is positioned on the low refractive index zone, such that the low refractive index zone is directly sandwiched between the two high refractive index zones. A fourth zone, a low refractive index zone, follows the second high refractive index zone. Anti-iridescence is provided for a wide variety of optically functional topcoats without significant impairment of the optical performance thereof. Certain preferred embodiments are particularly well adapted for low emissivity glazing for architectural applications.

15 Claims, 4 Drawing Sheets

ANTI-IRIDESCENCE COATINGS

INTRODUCTION

This invention is directed to anti-iridescence coatings particularly suitable for use on glass and other transparent substrates, such as in glazing applications and the like. A multi-zone anti-iridescence layer is provided on a substrate surface beneath an optically functional layer. The invention further provides methods for producing such structures.

BACKGROUND OF THE INVENTION

It is well known that glass and like transparent substrates can be coated with transparent films to provide or alter optical properties, such as transmission, reflection, electrical conductivity, etc. Particularly significant commercial uses for such coatings include, for example, infrared reflection, low-emissivity and solar load reduction, etc. In solar load control applications, for example, such coatings reduce the amount of solar energy in the non-visible wavelengths passing through the glazing panel to reduce an air-conditioning load within a building, motor vehicle, etc. In a low emissivity glazing application, such coatings reduce the heating load of a building in a cold climate by reducing the loss of infrared radiation from the heated interior of the building through the glazing panel. Typically, for example, glass and other transparent materials can be coated with transparent semi-conductor films such as tin oxide, indium oxide or cadmium stannate, in order to reflect infrared radiation. Coatings of these same materials and other materials also conduct electricity, and are employed as resistance heaters to heat windows, particularly in motor vehicles, airplanes, etc. to remove fog and ice.

It is a recognized problem that substrates bearing such coatings may show iridescence, that is, color in reflected light and, to a lesser extent, in transmitted light. Such iridescence is understood to be generally the result of an interference phenomenon wherein certain wavelengths reflected partially at the exterior of the coating are out of phase with light of that wavelength reflected from the interface of the coating with the substrate, while reflected light of other wavelengths is in phase and interferes additively. The degree to which the reflected light of a given wavelength cancels or interferes additively is a function of the wavelength and the optical thickness of the coating.

The iridescence effect typically associated with coatings less than about 1 micron, especially less than about 0.75 microns, is aesthetically unacceptable in many architectural, motor vehicle and other applications. In fact, interference colors most generally occur with coatings in the thickness range of 0.1 to 1.0 micron, a thickness range of significant practical importance in many commercial applications. A large portion of present commercial production of coated glass glazing panels, for example, comprise coatings in the thickness range of about 0.1 to 1.0 micron, which display pronounced iridescent colors, especially in reflected daylight. The presence of iridescence is commonly understood to inhibit the use of more energy efficient coated glass in many glazing applications, despite the fact that the potential energy conservation would make the application cost effective. In addition, lack of thickness uniformity in the coating results in the appearance of multiple colors on a single piece of glass, sometimes referred to as banding, often rendering the glazing unit visually unacceptable.

One known means of reducing visible interference colors from such film coatings on glass or a like substrate is to increase the thickness of the coating to greater than one micron. Thicker coatings, however, are more expensive to make, requiring more reactant and longer deposition times. Furthermore, they have a greater tendency to crack as a result of thermal stress. An alternative means of reducing interference color involves the use of an underlayer coating between the substrate surface and the optically functional coating. For example, a known color suppressing undercoat for a fluorine-doped tin oxide low emissivity coating 3,000 to 4,000 Angstroms thick consists essentially of a Si-O-C interlayer between the glass substrate and the overcoat. The interlayer has a refractive index intermediate that of the substrate and the overcoat and is about 700 Angstroms thick.

In U.S. Pat. No. 4,440,822 to Gordon heat loss by infrared radiation through the glass areas of a heated building is said to be approximately one-half the heat loss through uncoated windows. The presence of iridescent colors on coated glass is said to be a major reason preventing its use. The Gordon '822 patent is directed to transparent glass window structures wherein the glass bears a coating of infrared reflective material with an interlayer of continuously varying refractive index between the glass and the coating. The refractive index of the interlayer is said to increase continuously from a low value at the interface of the interlayer with the substrate to a high value at the interface with the infrared reflective coating. FIG. 5 of that patent, for example, shows an underlayer consisting of tin oxide and silicon oxide wherein the relative proportion of tin and, hence, the refractive index, both increase with distance from the glass surface. The refractive index increases from about 1.5 at the glass surface to about 2.0 at the interface with the thick film coating of infrared reflective material. Reducing color to a low level of iridescence by interposing, between a substrate and a coating, a graded-index layer that varies in refractive index between the values at the two boundaries also is suggested in *Principles of Design of Architectural Coatings*, APPLIED OPTICS, Volume 22, No. 24, pp. 4127–4144 (Dec. 15, 1983).

Other approaches have been suggested. In U.S. Pat. No. 4,308,316 to Gordon and in U.S. Pat. No. 4,187,336 to Gordon (a division of Gordon '316) single and double layer undercoats on glass under a thick film coating of tin oxide are taught for reducing iridescence. The one or more layers of transparent material between the glass and the semi-conductor coating are said to have refractive indices intermediate those of the glass and the semi-conductor. The double interlayer taught by these patents involves a first sub-layer closest to the glass having a lower refractive index and a second sub-layer closer to the semi-conductor coating having a relatively higher refractive index, both values being, as stated immediately above, intermediate the refractive index values of the glass and the coating.

In U.S. Pat. No. 4,419,386 to Gordon and 4,377,613 to Gordon (a division of Gordon '386) an intermediate layer is placed between a glass substrate and an infrared reflecting coating to reduce iridescence. The interlayer is similar to that disclosed in above mentioned U.S. Pat. No. 4,187,336 to Gordon, except that the order of refractive index is reversed. That is, the sub-layer further from the glass has the lower refractive index while the sub-layer closer to the glass has the higher refractive index. It is claimed that by reversing the order the color suppression is achieved using thinner layers.

The importance of color properties for window coatings is recognized also in *Evaporated Sn-Doped $In_2O_3$ Films: Basic Optical Properties and Applications to Energy-Efficient Windows*, J. Appl. Phys. 60 (11) pp. 123-159. Section X.C of that article discusses anti-reflection treatment for significantly decreasing iridescence. It is noted that iridescence has plagued earlier oxide-type window coatings, leading manufacturers to use film thicknesses much larger than those required to obtain a desired low thermal emittance. This is noted to be inefficient in terms of materials utilization and process time. An anti-reflection coating of sputtered aluminum oxyfluoride material is mentioned.

Many such known anti-iridescence undercoats, including some of the undercoats of the Gordon patents, present a haze problem. Specifically, some of the Gordon patents admit that many of the disclosed coatings, when used on ordinary window glass, show considerable haze or scattered light. To remedy this deficiency, Gordon recommends first depositing on the glass substrate surface a layer of low refractive index material such as $SiO_2$. Also suggested for this purpose are $Si_3N_4$ and $GeO_2$. In particular, it is asserted that if the initial layer contains large proportions of materials including, for example, $SnO_2$, "then haze formation is likely."

Another difficulty connected with the anti-iridescence undercoats suggested in the Gordon patents and in other teachings is their sensitivity to the thickness of the interlayers. Specifically, the degree of anti-iridescence efficacy depends strongly on depositing the interlayers within precise thickness ranges and with highly uniform thickness. In U.S. Pat. No. 4,187,336, for example, it is suggested that a change of plus or minus 0.02 in the refractive index or a change of plus or minus 10% in the thickness of certain single layer undercoatings would be sufficient to raise the color saturation to observable values. In coated substrate production on an industrial scale, it may be difficult in certain instances to guarantee coating deposition within such narrow ranges. Certain double interlayer systems are suggested by Gordon to have broader permissible thickness variations. Coating systems tolerant of film thickness variations are commercially and economically desirable.

It is an object of the present invention to provide a substantially transparent glazing article having a coating with an anti-iridescence layer which is, at least in certain preferred embodiments of the invention, tolerant of deviations in its parameters, specifically, deviations in the thickness and refractive index of both the anti-iridescence interlayer and the optically functional coating (low emissivity coating, solar load control coating, etc.). In particular, it is an object of the invention to provide a substantially transparent glazing article and a method of producing the same which are robust in their industrial implementation. Specifically, it is an object of the invention to provide such glazing article wherein at least certain preferred embodiments have product and manufacturing process specifications with tolerance ranges readily achievable using presently available manufacturing techniques and equipment. These and other objects of the present invention will be better understood from the following disclosure and description thereof.

SUMMARY OF THE INVENTION

In accordance with a first aspect of the present invention, a substantially transparent glazing article comprises a substantially transparent substrate bearing a coating on at least an area of a surface thereof. The coating comprises an optically functional layer and an anti-iridescence layer mediate the substrate surface and the optically functional layer. The optically functional layer is adapted to provide optical functionality, such as low emissivity, solar load control, electrical conductivity, infrared and ultraviolet reflectivity, etc. Such optically functional layer may consist of a single homogenous film or may comprise a film stack, depending on the optical function(s) to be performed. In either case, iridescence otherwise present is overcome by an anti-iridescence layer. The anti-iridescence layer is less thick than the optically functional layer and comprises alternating high and low refractive index zones, each of substantially uniform thickness and refractive index, in stacked relationship. A first zone directly on the substrate surface has a higher refractive index than the substrate. A second zone of the anti-iridescence layer is a low refractive index zone positioned directly on the first high refractive index zone. It has a refractive index lower than that of the first zone. A third zone of the anti-iridescence layer is a second high refractive index zone. It has a refractive index higher than that of the second zone. A fourth zone of the anti-iridescence layer is a second low refractive index zone positioned on the third zone. It has a refractive index lower than that of the third zone. In those preferred embodiments wherein the fourth zone is the last zone of the anti-iridescence layer, the refractive index of the fourth zone is lower than that of the optically functional layer with which it forms an interface. Thus, the anti-iridescence layer of the invention comprises alternating high and low refractive index zones in stacked relationship, at least the first low refractive index zone being sandwiched between high refractive index zones. Additional zones of alternating high and low refractive index may be stacked over the aforesaid first four zones, as further described below. In addition to providing anti-iridescence, the anti-iridescence layer of the invention can be readily designed to provide highly uniform and muted color to a coating which, in certain applications, will be highly aesthetically desirable.

A second aspect of the invention is directed to a method of producing the substantially transparent glazing article disclosed immediately above. Specifically, such method comprises depositing the anti-iridescence layer on the substantially transparent substrate, first depositing a high refractive index zone, followed by low refractive index zones alternating with one or more additional high refractive index zones. The optically functional layer is then deposited over the anti-iridescence layer. As discussed further below, certain preferred embodiments of the invention involve performing the aforesaid deposition by means of pyrolytic deposition techniques.

The present invention is a significant advance in the art of coated glazing articles for a number of reasons. Most notably, it provides in certain preferred embodiments a product and a method of producing such product which are tolerant of naturally occurring variations in film thicknesses both in the optically functional layer and in the anti-iridescence layer, film thickness uniformity, refractive index values, and the like. The substantially transparent glazing articles of preferred embodiments of the invention have little or no visible iridescence, yet provide desired optical properties such as, for example, low emissivity, infrared reflectivity, ultraviolet reflectivity and/or electrical conductivity. The anti-iridescence layer of the present invention is compatible with many commercially significant coatings employed to provide such optical properties. In accordance with certain preferred embodiments, a single, uniform, muted perceptible color or a colorless appearance is provided. In addition, such advantages are achieved in many preferred embodiments of the invention with little or no production cost increase over the cost of prior known anti-iridescent films. This is achieved in that the present invention allows, in certain preferred embodiments, simplified process control, reduced material usage, less expensive materials and/or shorter production time. It should be noted in this regard, that it is a significant advantage of the present invention that the anti-iridescence undercoat of preferred embodiments is effective in providing a colorless appearance over a broad thickness range for many optically functional overcoats. It will also be appreciated by those skilled in this industrial area that the invention can provide these features and advantages employing well-known and readily commercially available production equipment and materials. In addition, while not wishing to be bound by theory, the performance of such preferred embodiments is understood to be improved by sodium suppression provided by the anti-iridescence layer. Moreover, some or all of the above advantages can be achieved in accordance with certain preferred embodiments of the invention through the use of a continuous manufacturing process which is fully compatible with techniques presently used in the coated glass industry. Presently available optics predictions programs, versions of which are commercially available and well-known to those skilled in the coated glass industry, can be readily employed to identify optimal thicknesses and refractive indexes for the various zones of the anti-iridescence layer of the invention.

It is a highly significant feature of the anti-iridescence layer of the glazing article of the present invention that a low refractive index zone is sandwiched between high refractive index zones. While not wishing to be bound by theory, significant advantages of the invention are believed to result at least partly from this key feature. Notably, its industrial robustness, that is, its tolerance of parameter variations, such as film thickness, refractive index etc., is believed due at least partly to this high-/low/high refractive index sandwiching feature.

Another critical feature of the present invention is the presence of at least five refractive index changes, including both changes from high to low and low to high refractive index. The change in the value of the refractive index at each step should be at least about 0.1, more preferably at least about 0.2. In addition, the step must involve a zone or film thickness sufficient to function as a discrete film. Preferably, each such step or change involves a film thickness of at least about 100 Angstroms. Those skilled in the art will recognize that all industrial deposition methods involve the creation of a gradient of some thickness wherein the change from one zone to the next occurs. The reference to a change or step in the context of the present invention is intended to mean that the change from one zone to the next is sufficiently sharp that, taken in conjunction with the thickness of the film, the optical properties of a substantially discrete refractive index step (either from high to low or low to high, as the case may be) is achieved.

Additional advantages and features of the invention will be better understood from the detailed description of certain preferred embodiments set forth below, taken in conjunction with the accompanying drawings

Figure 1:
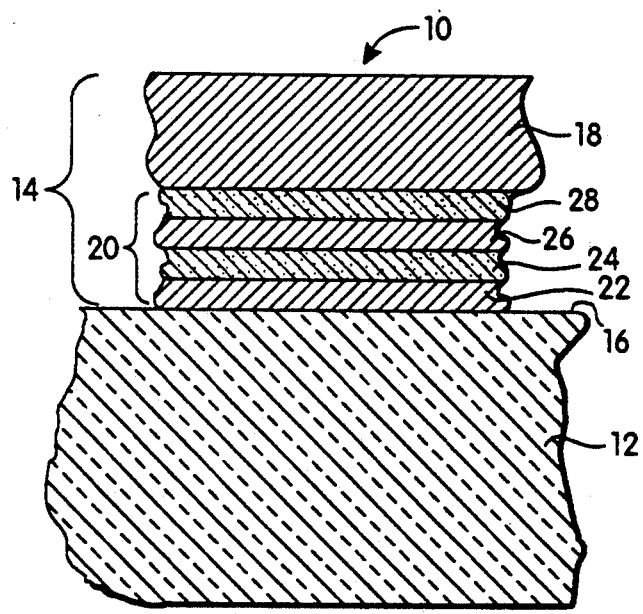
FIG. 1 is a cross-sectional view of a substantially transparent glazing article, partially broken away, in accordance with a preferred embodiment of the present invention, in which a substantially transparent coating is formed on a surface of a glass substrate.

It should be recognized that FIG. 1 is not to scale and film thicknesses are greatly exaggerated with respect to the glass substrate for clarity of illustration and ease of understanding the drawings.

DETAILED DESCRIPTION OF PREFERRED EMBODIMENTS

It should be understood that occasional reference herein to the optically functional layer as a "top coat" or the like, is for ease of discussion and understanding, especially taken in conjunction with the drawings wherein the optically functional layer is illustrated as a mono-film in a "top" position. It is not intended, however, to limit the optically functional layer to one exposed to the atmosphere or otherwise necessarily occupying a "top" position. Thus, for example, in certain embodiments of the invention additional layers, for example protective layers, may cover the optically functional layer. In other embodiments the coated surface may be laminated to a second ply of the glazing article.

Anti-iridescence undercoats of the present invention are applicable both to provide a colorless appearance for a coated substrate, and, in the alternative, to provide a single, substantially uniform, muted, perceptible color in the glazing article. Based on the present disclosure, refractive indices and film thicknesses to achieve such results, along with determining other optical features and properties of the finished product, can be readily determined empirically by those skilled in the art or, for example, by employing a commercially available optics prediction software program. Such programs, typically run on commercially available computer systems, are well known to greatly facilitate close approximation of an optimized final commercial product. Typically, a graphic presentation of the optical properties of a given glazing article, sorted by individual layer thickness and refractive index, can be used to determine the regions of optimum film stack design. In particular, such graphic representation can assist in readily identifying industrially robust film stack designs of the present invention. That is, designs in which performance is tolerant of variations in film thickness, refractive index and other parameters normal during industrial production of coated glazing articles.

Referring now to FIG. 1, a substantially transparent glazing article 10 is seen to comprise a glass substrate 12 having coating 14 carried on its upper surface 16. The glass substrate 12 preferably is soda-lime glass having a refractive index of about 1.5. The glazing article may, for example, be adapted for use in an architectural glazing application or the like. Those skilled in the art will recognize that substrates alternative to glass will be suitable, although certain methods of forming coating 14, such as pyrolytic deposition, may be unsuitable for certain alternative substrate materials, for example, certain plastic substrates. The coating 14 comprises an optically functional layer 18 having a higher refractive index than the substrate. Layer 18 is exposed to the atmosphere. According to the preferred embodiment of FIG. 1, the coating provides optical functionality including low emissivity. Preferably, optically functional layer 18 is about 2,000 to 10,000 Angstroms thick, more preferably about 2,000 to 5,000 Angstroms thick, most preferably about 3,500 to 4,000 Angstroms thick, having an average refractive index (over the visible wavelength range) of about 1.7 to 2.5, more preferably about 1.9 to 2.1, most preferably about 1.9 (measured for 550 nm wavelength light). Such preferred materials for the optically functional layer 18 include, for example, tin oxide, fluorine doped tin oxide and other metal oxides of suitable refractive index. According to a most preferred embodiment, layer 18 consists essentially of fluorine doped tin oxide having a refractive index (average) of 1.9. In such embodiment layer 18 is substantially transparent, that is, it is substantially transparent (within the context of its intended use) to visible light. It also provides infrared reflectivity and ultraviolet reflectivity for solar load control. In addition, it has good electrical conductivity and could be used, therefore, for applications including electrical resistance heating, etc. The high/low/high refractive index sandwiching feature of the invention is especially effective in use under an optically functional layer consisting of fluorinated tin oxide in certain distinct thickness ranges: 2500–3000 Angstroms, 3500–4000 Angstroms and 4800–5200 Angstroms. Tolerance to thickness variations is especially good for fluorinated tin oxide in the first two ranges. Approximately the same preferred thickness ranges apply to unfluorinated tin oxide. In general, the terms "tin oxide" and "SnO$_2$," as used hereinafter, mean both fluorinated and unfluorinated tin oxide, unless otherwise specified. Such preferred embodiments of the invention are particularly advantageous for use in insulated glazing units and like applications. Insulated glazing units include those with multiple panes having an air gap between adjacent panes. In a two pane glazing unit, taking the outside surface of the outer pane as the No. 1 surface, its inside surface (i.e., the surface facing the air gap) as the No. 2 surface, the outside surface of the inner pane (again, facing the air gap) as surface No. 3, and the inside surface of the inner pane as the No. 4 surface, a coating of the invention according to such preferred embodiments would preferably be on the No. 3 surface in a colder climate (such as Northern U.S.) and on the No. 2 surface in a warmer climate (such as Southern U.S.). In a triple glazed unit, the coating preferably is on the No. 2 surface in a warmer climate and on the No. 5 surface (the air gap side of the innermost pane) in a colder climate.

According to another highly preferred embodiment of the invention, glazing article 10 is adapted for architectural glazing purposes and the coating 14 is a low emissivity coating in which layer 18 consists essentially of fluorinated tin oxide, having a thickness between about 3,500 and 4,000 Angstroms. In conjunction with the preferred anti-iridescence layer described below, the resulting glazing article is substantially colorless in both reflected and transmitted light. That is, the visible iridescence which would otherwise be shown by such glazing article is eliminated without substantially impairing the optical properties of the coating. Specifically, the low emissivity property of the tin oxide or fluorine-doped tin oxide layer is not significantly reduced or impeded by the anti-iridescence layer. It is a significant advantage of preferred embodiments of the invention that anti-iridescence is achieved with such thin optically functional films. As noted above, certain prior art teaching has recommended the use of thicker films to avoid iridescence, although this involves several disadvantages, including a greater tendency toward thermal stress cracking, longer (and, hence, more costly) deposition periods, greater loss of transparency, etc.

It will be recognized by those skilled in the art in view of the present disclosure that numerous alternative optically functional layers can be employed in lieu of, or together with, the tin oxide layer 18 of the above discussed preferred embodiment of the invention. Particularly advantageous alternative materials include, for example, zinc oxide, titanium oxide, indium tin oxide, antimony doped tin oxide and tungsten oxide. The optically functional layer 18 also may be a composite of multiple films and may not be exposed to the atmosphere, as noted above. Thus, for example, the aforesaid low emissivity film may be provided with an overcoating of protective material, such as silicon dioxide, etc. Those skilled in the art will recognize innumerable additional and alternative films which may be used together with the main film of the optically functional layer 18 including adjunct films such as, for example, abrasion resistant films, color imparting films, and the like. With respect to coating 14 not being exposed to the atmosphere, it may be positioned at an interface between laminated plies of a glazing article. Alternatively, it may be employed on an inside surface of a transparent substrate used in a double glazing article, such that the coating is exposed to a vacuum or air gap between two spaced plies.

Coating 14 further comprises anti-iridescence layer 20 which substantially eliminates the visible iridescence which would otherwise show, particularly in viewing sunlight reflected from the coated surface. The anti-iridescence layer 20 eliminates visible iridescence while not significantly impairing the optically functional film's desirable properties discussed above, including most notably its visible transparency, infrared reflectivity, ultraviolet reflectivity and low emissivity. Layer 20 is less thick than the optically functional layer 18 being preferably about 400 to 1200 Angstroms thick overall, more preferably about 500 to 800 Angstroms. In the preferred embodiment of FIG. 1, anti-iridescence layer 20 consists essentially of four alternating refractive index zones in stacked arrangement, wherein a low refractive index zone is sandwiched between two high refractive index zones. High refractive index zone 22 is deposited directly on surface 16 of glass substrate 12. It should be understood that description of a layer or zone as being deposited "directly" on or over another surface or another layer is intended to mean that it forms an interface with such layer or surface without any other layer of zone intervening between them. In the preferred embodiment illustrated, anti-iridescence layer 20 is positioned directly on surface 16 and directly under layer 18. As used herein, this is intended to mean there is no thin film coating or the like mediate the anti-iridescence layer 20 and the substrate 12. Thus, surface 16 is a surface of the bulk material of substrate 12, rather than of some other coating material deposited onto substrate 12 prior to deposition of coating 14. Similarly, anti-iridescence layer 20 is positioned directly under optically functional layer 18 in the sense that there is no mediate film or coating between them.

High refractive index zone 22 preferably is about 50 to 500 Angstroms thick, more preferably 100 to 300 Angstroms thick. It is a significant feature of the embodiment of FIG. 1, in accordance with general principles of the invention discussed above, that first zone 22 has a refractive index higher than that of the substrate 12. For a substrate of soda-lime glass or other material having a refractive index about 1.5, the refractive index of zone 22 preferably is between about 1.6 and 2.5, more preferably being about 1.9. Suitable materials for high refractive index zone 22 are readily commercially available and will be apparent to those skilled in the art in view of the present disclosure. Tin oxide, having a refractive index of 1.9, is most preferred for zone 22 in the above mentioned low emissivity embodiment of the invention employing a glass substrate 12 and a tin oxide (optionally fluorinated) optically functional layer 18. Certain preferred materials for high refractive index zone 22 are listed in Table A below.

TABLE A

Coating Materials with High Refractive Index

| Material | Formula | Refractive Index |
|---|---|---|
| tin oxide | $SnO_2$ | 1.9 |
| silicon nitride | $Si_3N_4$ | 2.0 |
| silicon monoxide | SiO | about 2.0 |
| zinc oxide | ZnO | 2.0 |
| indium oxide | $In_2O_3$ | 2.0 |
| vanadium oxide | $V_2O_5$ | about 2.0 |
| tungsten oxide | $WO_3$ | about 2.0 |
| niobium oxide | $Nb_2O_5$ | 2.1 |
| tantalum oxide | $Ta_2O_5$ | 2.1 |
| zirconium oxide | $ZrO_2$ | 2.1 |
| cerium oxide | $CeO_2$ | 2.2 |
| zinc sulfide | ZnS | 2.3 |
| titanium oxide | $TiO_2$ | 2.5 |

Most preferably the first thickness zone 22 is a substantially uniformly thick film of tin oxide having a refractive index of about 1.9 and a thickness between about 100 and 300 Angstroms.

Second zone 24 is positioned directly on first zone 22 and has a refractive index less than zone 22. Preferably the refractive index of zone 24 is between about 1.38 and 1.65 more preferably about 1.44. The thickness of zone 24 preferably is between about 50 and 500, more preferably between about 100 and 300 Angstroms. The thickness of zone 24 preferably is about the same as that of zone 22. In the preferred embodiment disclosed above, wherein the substrate is glass having a refractive index of about 1.5 and zone 22 is 100 to 300 Angstroms tin oxide having a refractive index of 1.9, zone 24 preferably is a substantially uniform film of silicon dioxide having a refractive index of about 1.44 and a thickness approximately equal to that of the tin oxide film 22. Alternative materials suitable for second zone 24 are readily commercially available and will be apparent to those skilled in the art in view of the present disclosure. Certain preferred materials suitable for the low refractive index zone 24 are listed in Table B, below.

TABLE B

Coating Materials with Low Refractive Index

| Material | Formula | Refractive Index |
|---|---|---|
| aluminum oxide | $Al_2O_3$ | 1.65 |
| silicon dioxide | $SiO_2$ | 1.44 |
| silicone polymer | $[(CH_3)_2SiO]_n$ | 1.4 |
| magnesium fluoride | $MgF_2$ | 1.38 |
| cryolite | $Na_3AlF_6$ | 1.33 |

It will be readily apparent to those skilled in the art that blends of materials deposited together as a substantially homogenous film or layer can be used in the present invention. Blends of material are particularly suitable to achieve a particular refractive index not readily obtainable with a single material.

Third zone 26 is the second high refractive index zone in the anti-iridescence layer. It is deposited directly on zone 24 and together with first zone 22 sandwiches the low refractive index zone 24 between high refractive index zones in accordance with a central principle of this invention. The thickness, refractive index, and choice of materials for zone 24 are the same as disclosed above in connection with zone 22. In fact, zone 26 most preferably is substantially identical to zone 22. Thus, in the highly preferred, low emissivity embodiment of the invention discussed above, wherein the substrate is glass having a refractive index of 1.5, high refractive index zone 22 is a film of tin oxide approximately 100 to 300 Angstroms thick having a refractive index of 1.9, and low refractive index zone 24 is silicon dioxide having a thickness of about 100 to 300 Angstroms and a refractive index of about 1.44, second high refractive index zone 26 most preferably is a 100 to 300 Angstrom thick film of tin oxide having a refractive index of about 1.9.

The fourth zone of anti-iridescence layer 20, the last zone after the anti-iridescence layer in the embodiment of FIG. 1, is a second low refractive index zone 28. Zone 28 is deposited directly on high refractive index zone 26 and preferably is substantially identical to the first low refractive index zone 24 in thickness, refractive index and choice of material. Thus, in the preferred, low emissivity embodiment discussed above, low refractive index zone 28 preferably is a substantially uniformly thick film of silicon dioxide having a thickness of about 100 to 300 Angstroms and a refractive index of about 1.44.

The change in the value of the refractive index from one zone of the anti-iridescence layer to the next should be at least about 0.1, more preferably at least about 0.4. In addition, each zone must be of sufficient thickness to function as a substantially discrete film. Preferably, each such step or change involves a film thickness of at least about 100 Angstroms. Those skilled in the art will recognize that all industrial deposition methods involve the creation of a region of some thickness wherein the change from one zone to the next occurs. The change or step in the context of the present invention from one gradient step zone to the next is sufficiently sharp, taking the refractive index change in conjunction with the thickness of the film, that the optical properties of a substantially discrete refractive index step (either from high to low or low to high, as the case may be) is achieved.

It should be understood that in accordance with the present invention one or more additional alternating layers of high and low refractive index material may be employed. Preferably such additional films are used in sets consisting of a low refractive index film over a high refractive index film to perpetuate the sequence established by the 4 refractive index zones described above in connection with FIG. 1.

Several processes for forming the coatings of the present invention are readily commercially available and are well known to those skilled in the art. Preferred processes for depositing the anti-iridescence layer 20 and the optically functional layer 18 include, for example, vacuum sputtering, sol-gel, and pyrolytic deposition, including spray pyrolysis and chemical vapor deposition. It should be recognized that the refractive index of the materials employed in the layers of the coating of the present invention may vary slightly depending on the method used in their deposition. The following examples illustrate production of certain preferred embodiments of the invention.

EXAMPLE 1

Soda-lime float glass was heated to about 600° C. in a laboratory belt furnace. Reactant mixtures were passed over the heated glass, forming the following layers:
(a) a substantially uniform film of tin oxide about 300 Angstroms thick was deposited from a reactant gas mixture of about 0.6% tin tetrachloride, 7.0% difluoroethane, 0.4% water and the balance nitrogen;
(b) a film of silicon dioxide about 100 Angstroms thick was deposited over the aforesaid tin oxide film from a reactant gas mixture containing about 0.5% silane, 30.8% oxygen and the balance nitrogen;
(c) a film of tin oxide about 300 Angstroms thick was deposited on the aforesaid silicon dioxide film from a reactant gas mixture having a composition the same as that employed in step (a);
(d) a fourth film was deposited directly on the second tin oxide film of step (c), specifically, a film of silicon dioxide approximately 100 Angstroms thick was deposited from a reactant gas mixture having a composition the same as that used in step (b);
(e) finally, a fluorine-doped tin oxide layer about 2,500 Angstroms thick was deposited directly over the second silicon dioxide film of step (d) using a reactant gas mixture the same as that of steps (a) and (c).

The resulting coated glass article was color suppressed, having a very muted pink color in reflection. Color purity was less than about 3%. It also has extremely low haze, even though the soda-lime float glass was not provided with a protective barrier undercoat of silica or the like. All film thicknesses were estimated based upon deposition rates. The coated glass article is adapted for use as low emissivity glazing for architectural and motor vehicle applications and the like.

Figure 2:
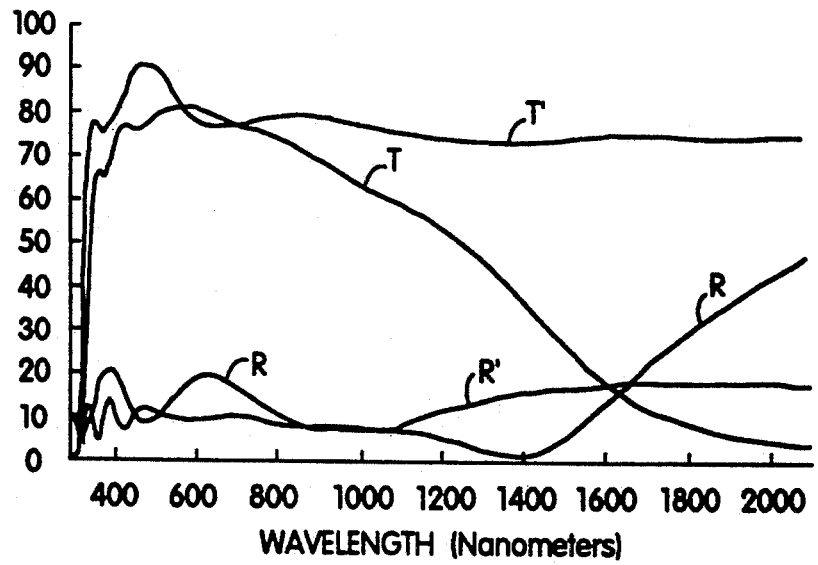
FIGS. 2 through 10 are graphs showing spectral data for the embodiments of the invention demonstrated in examples 1 through 9, respectively.

Spectral data for the coated glass article of Example 1 is shown in FIG. 2. Specifically, plot line T shows percent transmission of light through the coated article as a function of light wavelength. The percent reflection R of light from the coated surface of the glass article also is plotted as a function of wavelength. For purposes of comparison, the transmission T' and reflectance R' are also plotted for a coated glass article identical to that of Example 1 except that there is no anti-iridescence layer under the optically functional layer of 2,500 Angstroms tin oxide. It can be seen that the intensity of the reflectance curve for the color suppressed embodiment of Example 1 is reduced in comparison to that of the non-color suppressed article. Also, in the color suppressed article the peaks of the reflectance curve have been flattened, particularly in the wavelength range of 400 to 600 nm.

EXAMPLE 2

Soda-lime float glass was coated in accordance with the present invention using vacuum sputtering. Specifically, the following layers were sputtered:
(a) a layer of zinc oxide having a refractive index of about 2.0 and an optical thickness of about 100 Angstroms;
(b) a layer of silicon dioxide having a refractive index of about 1.45 and an optical thickness of about 200 Angstroms;
(c) a layer of zinc oxide having a refractive index of about 2.0 and an optical thickness of about 200 Angstroms;
(d) a layer of silicon dioxide having a refractive index of about 1.45 and an optical thickness of about 200 Angstroms; and
(e) a layer of zinc oxide having a refractive index of about 2.0 and an optical thickness of about 2,600 Angstroms.

The resulting coated glass article was substantially transparent, having a colorless appearance in reflected and transmitted light. Color purity was less than about 3%. In addition, the article had extremely low haze even though it had no protective barrier undercoat, such as silica, directly on the glass substrate surface under the first zinc oxide layer. The coated glass article was well adapted for use as low emissivity glazing for architectural and motor vehicle applications and the like.

Figure 3:
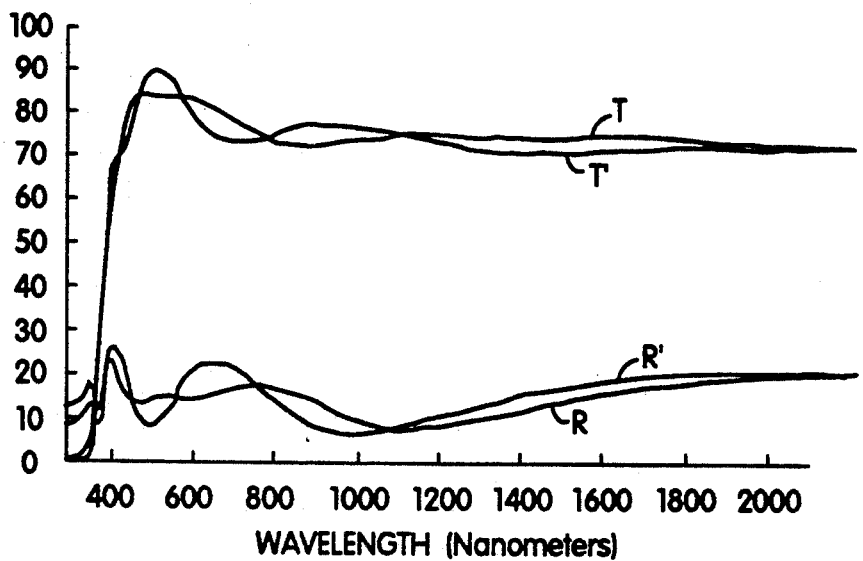

Spectral data for the coated glass article of Example 2 is shown in FIG. 3. Specifically, plot line T shows percent transmission of light through the coated article as a function of light wavelength. The percent reflection R of light from the coated surface of the glass article also is plotted as a function of wavelength. For purposes of comparison, the transmission T' and reflectance R' are also plotted for a coated glass article identical to that of Example 2 except that there is no anti-iridescence layer under the optically functional layer of 2,600 Angstroms zinc oxide. It can be seen that the intensity of the reflectance curve for the color suppressed embodiment of Example 2 is reduced in comparison to that of the non-color suppressed article. Also, in the color suppressed article the peaks of the reflectance curve have been flattened, particularly in the wavelength range of 400 to 600 nm.

EXAMPLE 3

The procedure of Example 1 above is repeated except film thicknesses are altered. Specifically, layers are formed as follows:
(a) a layer of tin oxide is deposited with a refractive index of about 1.9 and an optical thickness of 160–200 Angstroms;
(b) a layer of silicon dioxide is deposited with a refractive index of about 1.44 and an optical thickness of 100–150 Angstroms;
(c) a layer of tin oxide is deposited with a refractive index of about 1.9 and an optical thickness of 150–200 Angstroms;
(d) a layer of silicon dioxide is deposited with a refractive index of about 1.44 and an optical thickness of 100–150 Angstroms; and (e) a layer of tin oxide is deposited with a refractive index of about 1.9 and an optical thickness of 3500–4000 Angstroms.

The resulting coated glass article is substantially transparent, being essentially colorless in appearance both in reflected and transmitted light. Color purity is less than about 3%. In addition, the article has low haze, even without a protective barrier undercoat, such as silica, between the first tin oxide film and the glass substrate surface. The coated glass article is adapted for use as a low emissivity glazing for architectural and automotive applications and the like.

Figure 4:
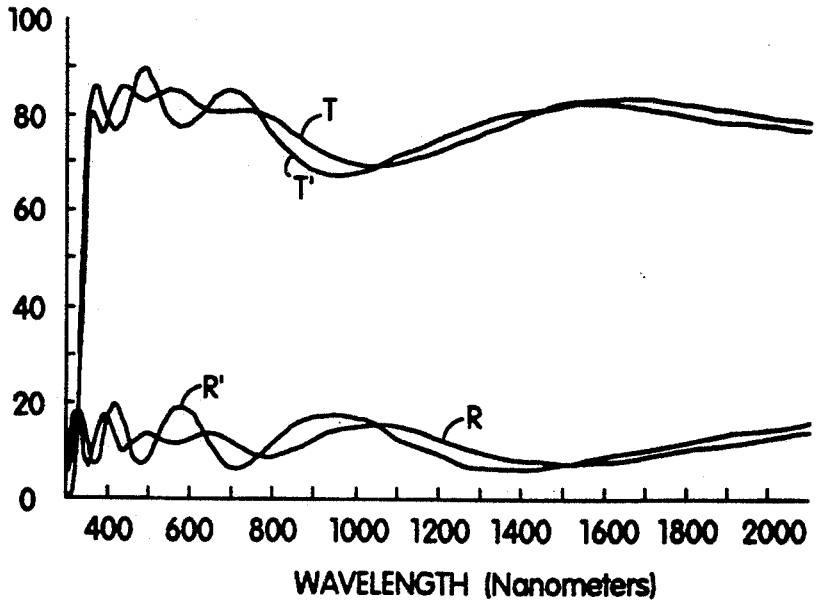

Spectral data for the coated glass article of Example 3 is shown in FIG. 4. Specifically, plot line T shows percent transmission of light through the coated article as a function of light wavelength. The percent reflection R of light from the coated surface of the glass article also is plotted as a function of wavelength. For purposes of comparison, the transmission T' and reflectance R' are also plotted for a coated glass article identical to that of Example 3 except that there is no anti-iridescence layer under the optically functional layer of 3,750 Angstroms tin oxide. It can be seen that the intensity of the reflectance curve for the color suppressed embodiment of Example 3 is reduced in comparison to that of the non-color suppressed article. Also, in the color suppressed article the peaks of the reflectance curve have been flattened, particularly in the wavelength range of 400 to 600 nm.

EXAMPLE 4

The procedure of Example 1 above is repeated except film thicknesses are altered. Specifically, layers are formed as follows:

(a) a layer of tin oxide is deposited with a refractive index of about 1.9 and an optical thickness of 200–250 Angstroms;

(b) a layer of silicon dioxide is deposited with a refractive index of about 1.44 and an optical thickness of 50–90 Angstroms;

(c) a layer of tin oxide is deposited with a refractive index of about 1.9 and an optical thickness of 50–90 Angstroms;

(d) a layer of silicon dioxide is deposited with a refractive index of about 1.44 and an optical thickness of 130–170 Angstroms; and (e) a layer of tin oxide is deposited with a refractive index of about 1.9 and an optical thickness of 3500–4000 Angstroms.

The resulting coated glass article is substantially transparent, being essentially colorless in appearance both in reflected and transmitted light. Color purity is less than about 3%. In addition, the article has low haze, even without a protective barrier undercoat, such as silica, between the first tin oxide film and the glass substrate surface. The coated glass article is adapted for use as a low emissivity glazing for architectural and automotive applications and the like.

Figure 5:
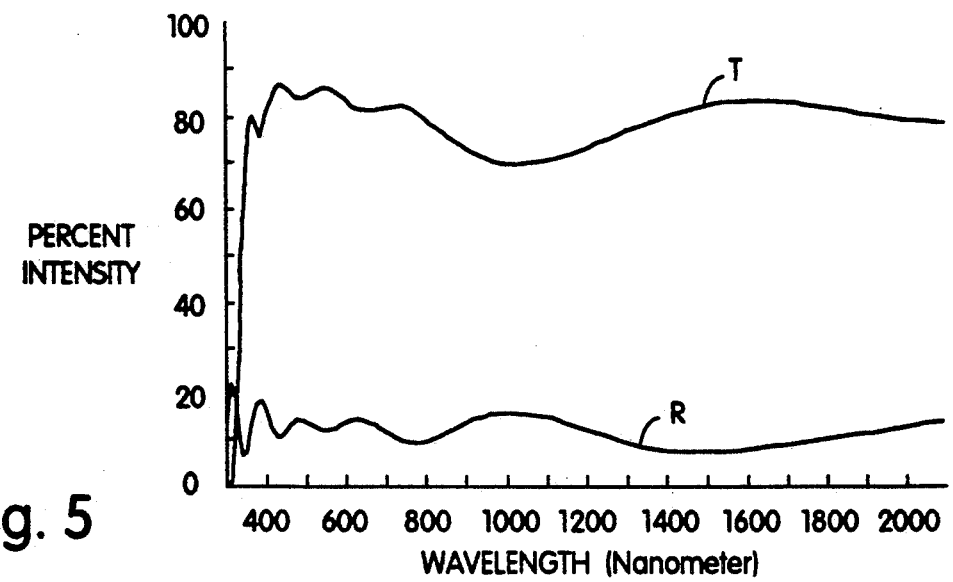

Spectral data for the embodiment of the invention produced in accordance with Example 4 are shown in FIG. 5. Specifically, transmittance T and reflectance R both are illustrated as a function of wavelength. The data for FIG. 5 were generated based upon modeling data derived from actual samples.

EXAMPLE 5

The procedure of Example 1 above is repeated except film thicknesses are altered. Specifically, layers are formed as follows:

(a) a layer of tin oxide is deposited with a refractive index of about 1.9 and an optical thickness of 180–220 Angstroms;

(b) a layer of silicon dioxide is deposited with a refractive index of about 1.44 and an optical thickness of 100–150 Angstroms;

(c) a layer of tin oxide is deposited with a refractive index of about 1.9 and an optical thickness of 90–140 Angstroms;

(d) a layer of silicon dioxide is deposited with a refractive index of about 1.44 and an optical thickness of 60–100 Angstroms; and (e) a layer of tin oxide is deposited with a refractive index of about 1.9 and an optical thickness of 3500–4000 Angstroms.

The resulting coated glass article is substantially transparent, being essentially colorless in appearance both in reflected and transmitted light. Color purity is less than about 3%. In addition, the article has low haze, even without a protective barrier undercoat, such as silica, between the first tin oxide film and the glass substrate surface. The coated glass article is adapted for use as a low emissivity glazing for architectural and automotive applications and the like.

Figure 6:
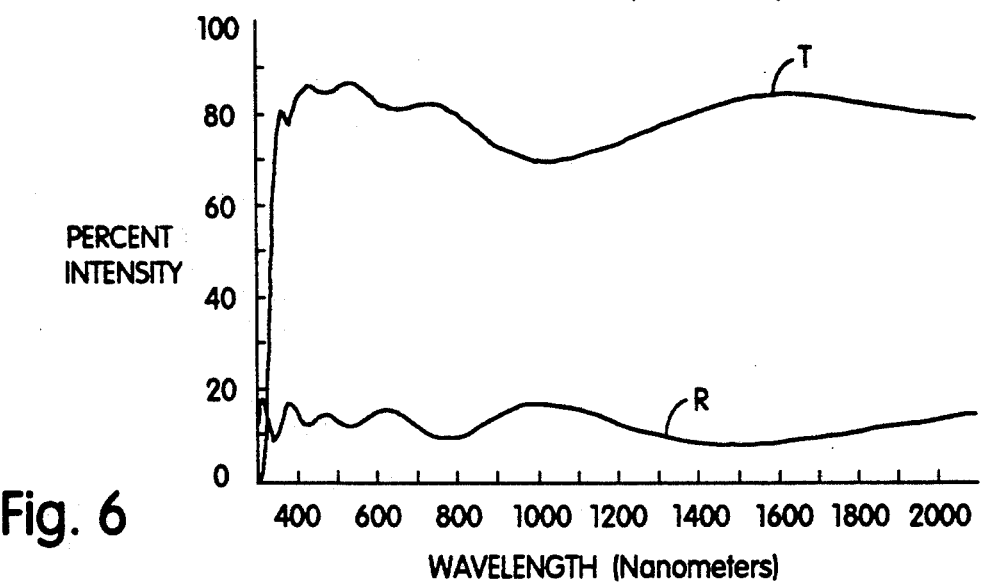

Spectral data for the embodiment of the invention produced in accordance with Example 5 are shown in FIG. 6. Specifically, transmittance T and reflectance R both are illustrated as a function of wavelength. The data for FIG. 6 were generated based upon modeling data derived from actual samples.

EXAMPLE 6

The procedure of Example 1 above is repeated except film thicknesses are altered. Specifically, layers are formed as follows:

(a) a layer of tin oxide is deposited with a refractive index of about 1.9 and an optical thickness of 180–210 Angstroms;

(b) a layer of silicon dioxide is deposited with a refractive index of about 1.44 and an optical thickness of 180–210 Angstroms;

(c) a layer of tin oxide is deposited with a refractive index of about 1.9 and an optical thickness of 210–250 Angstroms;

(d) a layer of silicon dioxide is deposited with a refractive index of about 1.44 and an optical thickness of 70–120 Angstroms; and (e) a layer of tin oxide is deposited with a refractive index of about 1.9 and an optical thickness of 3500–4000 Angstroms.

The resulting coated glass article is substantially transparent, being essentially colorless in appearance both in reflected and transmitted light. Color purity is less than about 3%. In addition, the article has low haze, even without a protective barrier undercoat, such as silica, between the first tin oxide film and the glass substrate surface. The coated glass article is adapted for use as a low emissivity glazing for architectural and automotive applications and the like.

Figure 7:
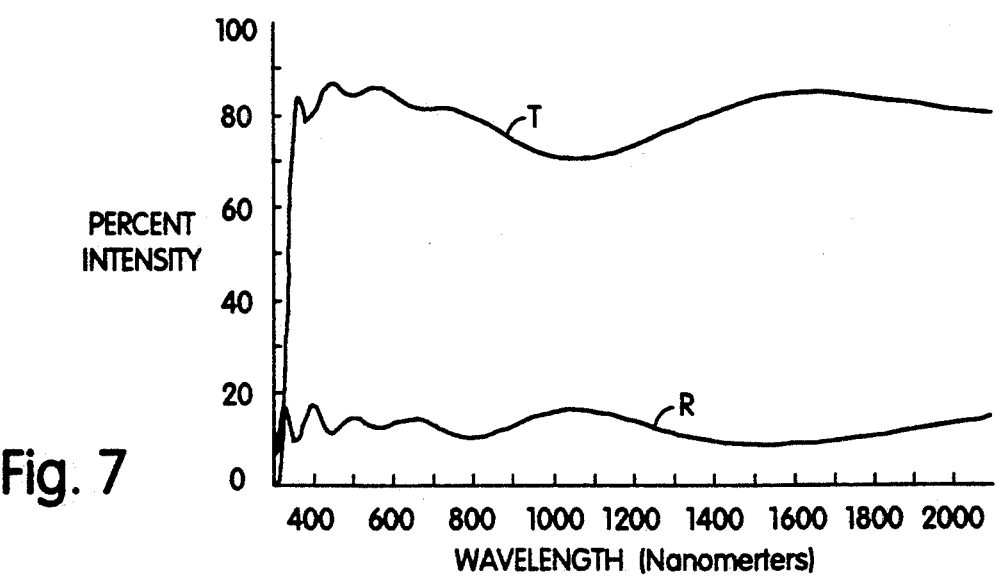

Spectral data for the embodiment of the invention produced in accordance with Example 6 are shown in FIG. 7. Specifically, transmittance T and reflectance R both are illustrated as a function of wavelength. The data for FIG. 7 were generated based upon modeling data derived from actual samples.

EXAMPLE 7

The procedure of Example 1 above is repeated except film thicknesses are altered. Specifically, layers are formed as follows:
(a) a layer of tin oxide is deposited with a refractive index of about 1.9 and an optical thickness of 120–180 Angstroms;
(b) a layer of silicon dioxide is deposited with a refractive index of about 1.44 and an optical thickness of 320–420 Angstroms;
(c) a layer of tin oxide is deposited with a refractive index of about 1.9 and an optical thickness of 340–420 Angstroms;
(d) a layer of silicon dioxide is deposited with a refractive index of about 1.44 and an optical thickness of 100–160 Angstroms; and
(e) a layer of tin oxide is deposited with a refractive index of about 1.9 and an optical thickness of 3500–4000 Angstroms.

The resulting coated glass article is substantially transparent, being essentially colorless in appearance both in reflected and transmitted light. Color purity is less than about 3%. In addition, the article has low haze, even without a protective barrier undercoat, such as silica, between the first tin oxide film and the glass substrate surface. The coated glass article is adapted for use as a low emissivity glazing for architectural and automotive applications and the like.

Figure 8:
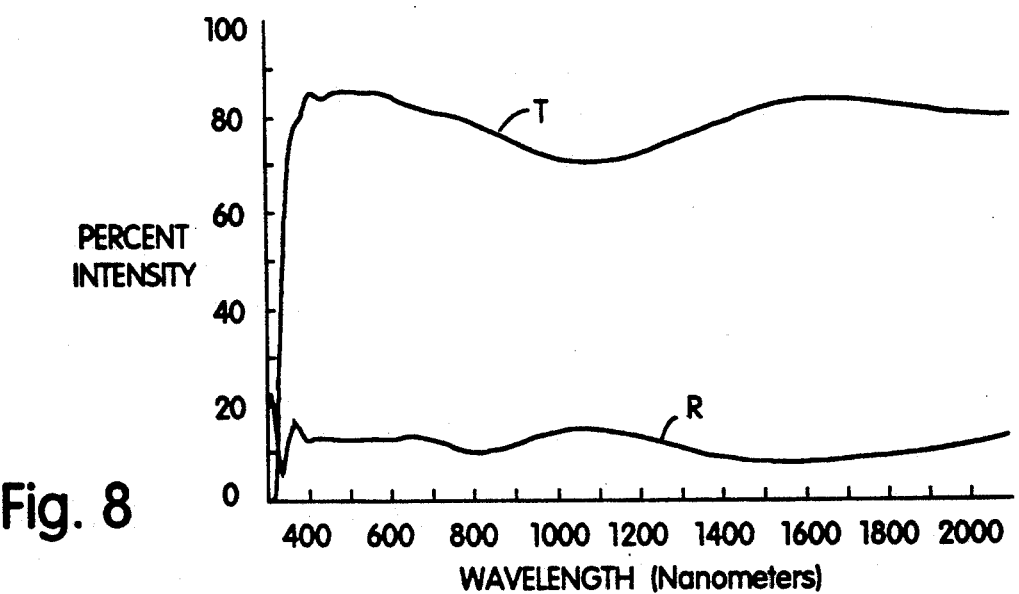

Spectral data for the embodiment of the invention produced in accordance with Example 7 are shown in FIG. 8. Specifically, transmittance T and reflectance R both are illustrated as a function of wavelength. The data for FIG. 8 were generated based upon modeling data derived from actual samples.

EXAMPLE 8

The procedure of Example 1 above is repeated except film thicknesses are altered. Specifically, layers are formed as follows:
(a) a layer of tin oxide is deposited with a refractive index of about 1.9 and an optical thickness of 275–325 Angstroms;
(b) a layer of silicon dioxide is deposited with a refractive index of about 1.44 and an optical thickness of 200–240 Angstroms;
(c) a layer of tin oxide is deposited with a refractive index of about 1.9 and an optical thickness of 500–600 Angstroms;
(d) a layer of silicon dioxide is deposited with a refractive index of about 1.44 and an optical thickness of 40–80 Angstroms; and
(e) a layer of tin oxide is deposited with a refractive index of about 1.9 and an optical thickness of 3300–3900 Angstroms.

The resulting coated glass article is substantially transparent, having a very muted color (480–510 nm) in appearance both in reflected and transmitted light. Color purity is in the range of 4–7%. In addition, the article has low haze, even without a protective barrier undercoat, such as silica, between the first tin oxide film and the glass substrate surface. The coated glass article is adapted for use as a low emissivity glazing for architectural and automotive applications and the like.

Figure 9:
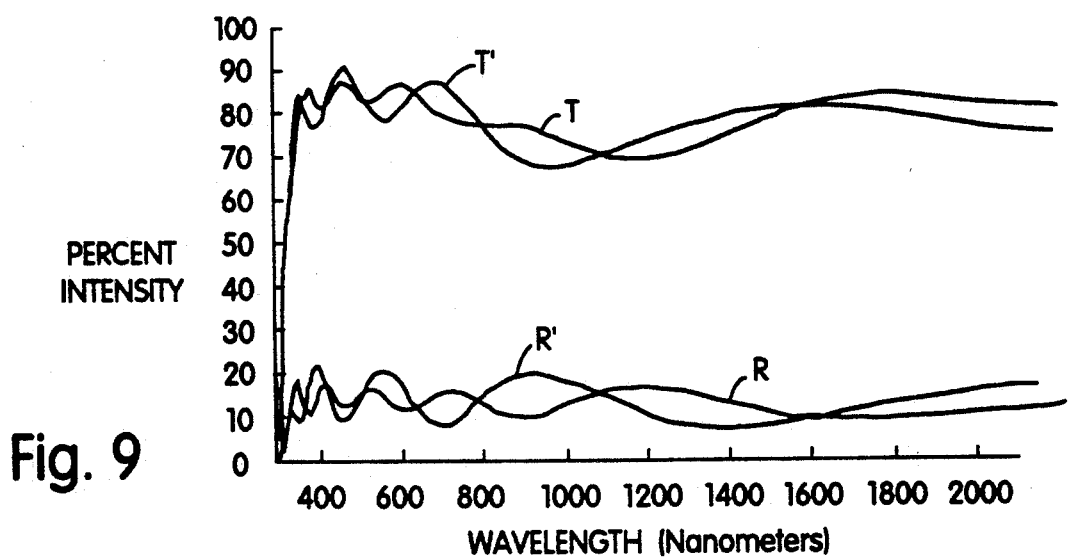

Spectral data for the coated glass article of Example 8 is shown in FIG. 9. Specifically, plot line T shows percent transmission of light through the coated article as a function of light wavelength. The percent reflection R of light from the coated surface of the glass article also is plotted as a function of wavelength. For purposes of comparison, the transmission T' and reflectance R' are also plotted for a coated glass article identical to that of Example 8 except that there is no anti-iridescence layer under the optically functional layer of 3,600 Angstroms tin oxide. It can be seen that the intensity of the reflectance curve for the color suppressed embodiment of Example 8 is reduced in comparison to that of the non-color suppressed article. Also, in the color suppressed article the peaks of the reflectance curve have been flattened, particularly in the wavelength range of 400 to 600 nm.

EXAMPLE 9

The procedure of Example 1 above is repeated except film thicknesses are altered. Specifically, layers are formed as follows:
(a) a layer of tin oxide is deposited with a refractive index of about 1.9 and an optical thickness of 250–300 Angstroms;
(b) a layer of silicon dioxide is deposited with a refractive index of about 1.44 and an optical thickness of 300–400 Angstroms;
(c) a layer of tin oxide is deposited with a refractive index of about 1.9 and an optical thickness of 450–510 Angstroms;
(d) a layer of silicon dioxide is deposited with a refractive index of about 1.44 and an optical thickness of 120–180 Angstroms; and
(e) a layer of tin oxide is deposited with a refractive index of about 1.9 and an optical thickness of 3050–3650 Angstroms.

The resulting coated glass article is substantially transparent, having a very muted color (480–510 nm) in appearance both in reflected and transmitted light. Color purity is in the range of 4–7%. In addition, the article has low haze, even without a protective barrier undercoat, such as silica, between the first tin oxide film and the glass substrate surface. The coated glass article is adapted for use as a low emissivity glazing for architectural and automotive applications and the like.

Figure 10:
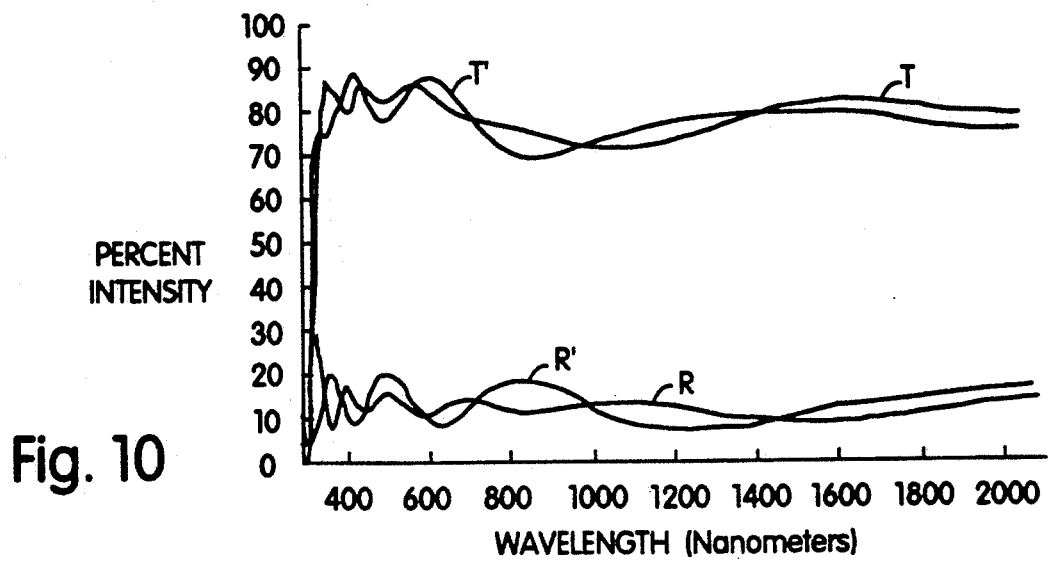

Spectral data for the coated glass article of Example 9 is shown in FIG. 10. Specifically, plot line T shows percent transmission of light through the coated article as a function of light wavelength. The percent reflection R of light from the coated surface of the glass article also is plotted as a function of wavelength. For purposes of comparison, the transmission T' and reflectance R' are also plotted for a coated glass article identical to that of Example 9 except that there is no anti-iridescence layer under the optically functional layer of 3,350 Angstroms tin oxide. It can be seen that the intensity of the reflectance curve for the color suppressed embodiment of Example 9 is reduced in comparison to that of the non-color suppressed article. Also, in the color suppressed article the peaks of the reflectance curve have been flattened, particularly in the wavelength range of 400 to 600 nm.

It will be understood by those skilled in the art in view of the present disclosure that the foregoing discussion of certain preferred embodiments is intended for purposes of illustration, rather than limitation. Various modifications will be readily apparent in view of the present disclosure and the following claims are intended to cover the full scope of the invention, including such apparent modifications.

We claim:

1. A substantially transparent glazing article comprising a substantially transparent substrate bearing a coating on a surface thereof, said coating comprising an optically functional layer having a refractive index higher than the substrate, and an anti-iridescence layer which is less thick than the optically functional layer and positioned mediate the substrate surface and the optically functional layer, the anti-iridescence layer comprising a first high refractive index zone directly on the substrate surface, having a refractive index at least 0.1 higher than the substrate, a first low refractive index zone over the first high refractive index zone, having a refractive index at least 0.1 lower than the first high refractive index zone, a second high refractive index zone over the first low refractive index zone, having a refractive index at least 0.1 higher than the first low refractive index zone, and a second low refractive index zone over the second high refractive index zone, having a refractive index at least 0.1 lower than the second high refractive index zone.

2. The substantially transparent glazing article of claim 1 wherein the thickness and the refractive index of the first low refractive index zone are substantially equal to those of the second low refractive index zone.

3. The substantially transparent glazing article of claim 2 wherein the refractive index of the first low refractive index zone and the second low refractive index zone each is less than the refractive index of the optically functional layer and less than the refractive index of the substrate.

4. The substantially transparent glazing article of claim 1 wherein the thickness and the refractive index of the first high refractive index zone are substantially equal to those of the second high refractive index zone.

5. The substantially transparent glazing article of claim 4 wherein the refractive index of the first high refractive index zone and the second high refractive index zone are substantially equal to that of the optically functional layer.

6. The substantially transparent glazing article of claim 1 wherein the substrate is glass having a refractive index about 1.5 and the first high refractive index zone and the second high refractive index zone each has a refractive index in the range of about 1.6 to 2.5.

7. The substantially transparent glazing article of claim 1, wherein the first high refractive index zone, the second high refractive index zone and the optically functional layer each consists essentially of $SnO_2$.

8. The substantially transparent glazing article of claim 1 wherein the substrate is glass having a refractive index about 1.5, the optically functional layer is approximately 2,000 to 10,000 Angstroms thick and consists essentially of tin oxide, the first high refractive index zone and the second high refractive index zone each is about 100 to 300 Angstroms and consists essentially of tin oxide, and the first low refractive index zone and the second low refractive index zone each is about 100 to 300 Angstroms thick and consists essentially of material selected from the group consisting of silicon dioxide.

9. The substantially transparent glazing article of claim 1 wherein the first low refractive index zone and the second low refractive index zone each has a refractive index in the range of about 1.38 to 1.65.

10. The substantially transparent glazing article of claim 9 wherein the first low refractive index zone and the second low refractive index zone each consists essentially of $SiO_2$.

11. The substantially transparent glazing article of claim 1 wherein the second low refractive index zone is directly under the optically functional layer.

12. The substantially transparent glazing article of claim 1 further comprising additional zones of alternating high and low refractive index mediate the second low refractive index zone and the optically functional layer.

13. A substantially transparent, low emissivity glazing article comprising a substantially transparent glass substrate having a substantially transparent coating on a surface thereof, the coating comprising an optically functional layer having a refractive index of approximately 1.9 and a substantially uniform thickness of about 2,000 to 5,000 Angstroms, consisting essentially of $SnO_2$, and an anti-iridescence layer mediate the substrate surface and the optically functional layer, consisting essentially of:

a first high refractive index zone directly on the substrate surface, consisting essentially of $SnO_2$ and having a refractive index of approximately 1.9 and a substantially uniform thickness of about 100 to 300 Angstroms;

a first low refractive index zone directly on the first high refractive index zone, consisting essentially of $SiO_2$ and having a refractive index of approximately 1.44 and a substantially uniform thickness of about 100 to 300 Angstroms;

a second high refractive index zone directly on the first low refractive index zone, consisting essentially of $SnO_2$ and having a refractive index of approximately 1.9 and a substantially uniform thickness of about 100 to 300 Angstroms; and a second low refractive index zone directly on the second high refractive index zone and directly under the optically functional layer, consisting essentially of $SiO_2$ and having a refractive index of approximately 1.44 and a substantially uniform thickness of about 100 to 300 Angstroms.

14. A method of making a substantially transparent glazing article comprising the steps of:

depositing a first high refractive index zone directly on a surface of a substantially transparent substrate, the first high refractive index zone having a refractive index at least 0.1 higher than said substrate;

then depositing a first low refractive index zone over the first high refractive index zone, the first low refractive index zone having a refractive index at least 0.1 lower than the first high refractive index zone;

then depositing a second high refractive index zone over the first low refractive index zone, the second high refractive index zone having a refractive index at least 0.1 higher than the first low refractive index zone;

then depositing a second low refractive index zone over the second high refractive index zone, the second low refractive index zone having a lower refractive index at least 0.1 lower than the second high refractive index zone; and then depositing an optically functional layer thicker than the anti-iridescence layer over the second low refractive index zone.

15. The method of claim 14 wherein each said zone and said optically functional layer is deposited by pyrolytic deposition.

* * * * *